July 10, 1928.

J. SEPON

TOY VEHICLE

Filed May 27, 1927

1,676,839

Inventor.
John Sepon
by Heard Smith & Tennant.
Attys.

Patented July 10, 1928.

1,676,839

UNITED STATES PATENT OFFICE.

JOHN SEPON, OF CHELSEA, MASSACHUSETTS.

TOY VEHICLE.

Application filed May 27, 1927. Serial No. 194,675.

This invention relates to toy vehicles and has for its object to provide various improvements in devices of this class all as will be more fully hereinafter set forth and pointed out in the appended claims.

In the drawings Fig. 1 is a perspective view of a toy vehicle embodying my invention;

Figure 1:
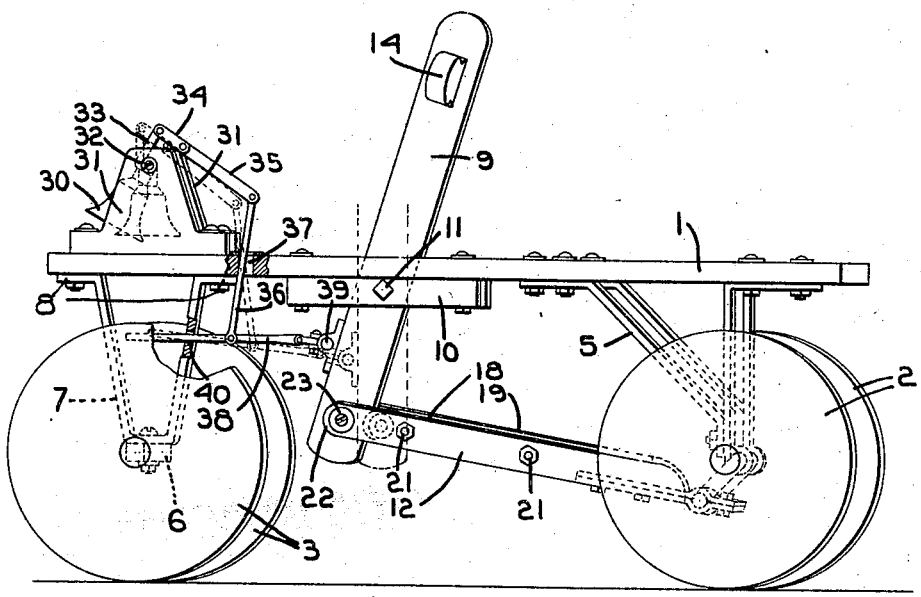
Figure 2:
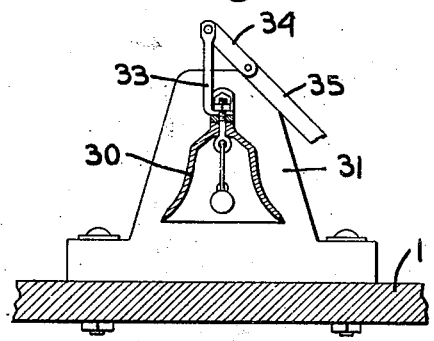
Fig. 2 is a sectional view showing the manner of mounting and means for ringing the bell.
Figure 3:
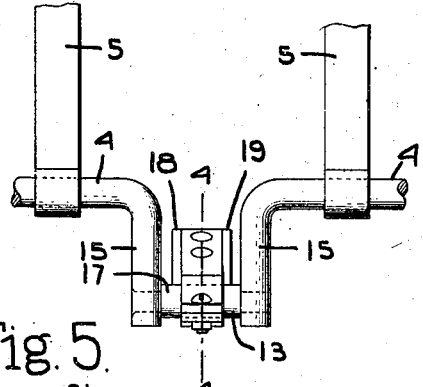
Fig. 3 is a fragmentary view showing the driving connection to the rear axle.
Figure 4:
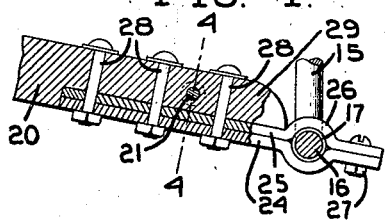
Fig. 4 is a section on the line 4—4, Fig. 3.
Figure 5:
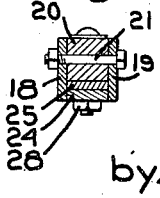
Fig. 5 is a section on the line 5—5, Fig. 4.

My improved toy vehicle is of that type comprising a body mounted on wheels together with means for propelling the vehicle and also for steering it. In the device illustrated 1 indicates the body of the vehicle which is in the form of a board adapted to form a seat for the driver. This body is supported on two rear or driving wheels 2 and two front or steering wheels 3. The driving wheels 2 are rigidly secured to the rear axle 4 which is journalled in suitable bearings or brackets 5 secured to the under side of the body 1. The front or steering wheels 3 are journalled on a front axle 6 which is pivotally connected to a front bracket member 7. This bracket member has a general U shape and is fastened at its upper end to the under side of the body 1 as shown at 8.

The device is steered by the feet of the rider in a well known way. That is, the rider places his feet on the front axle between the wheels 3 and the bracket 7 and by pushing forward with one foot or the other the front wheels may be turned to steer the vehicle into any desired direction.

The vehicle is propelled through the medium of an operating lever which is connected to the rear axle. This operating lever is shown at 9 and it extends through an opening in the body 1 and is pivotally connected to supports 10 fastened to the under side of the body as shown at 11. The lower end of the lever 9 is connected by a link or connecting rod 12 to the crank portion 13 of the rear axle 4.

The operating lever 9 is provided at its upper end with handles 14 which may be grasped by the hands of the operator and by moving the lever 14 back and forth the driving wheels 3 will be turned thereby propelling the vehicle forwardly.

The crank portion 13 of the rear axle is of special construction.

The axle is made in two sections and the inner end of each section is bent at right angles to the axis as shown at 15 and these two right angular portions 15 are rigidly connected by a pin 16 which is riveted in the ends 15. This pin 16 is surrounded by a bushing 17 which is free to turn thereon.

The connecting rod 12 is made with the two metal side plates 18, 19 and with the filling piece 20 of wood, said pieces 18, 19 and the filling piece 20 being folded together by bolts 21. The forward end 22 of the side pieces 18 and 19 project beyond the end of the filling piece 20 and said forward ends 22 are pivoted to the lower end of the operating lever 9 as shown at 23. At the rear end of the connecting rod are two plates 24, 25, each of which is provided with half round portions 26, said half round portions embracing and receiving the bushing 17.

The two plates 24, 25 are clamped together at their rear ends by a clamping screw 27 and are secured to the filling piece 20 by bolts 28. These plates 24, 25 are received between the side plates 18, 19, the rear end of the filling piece 20 being cut away as shown at 29 to receive the plates 24, 25. This makes a very sturdy construction and yet one which can be economically manufactured.

The vehicle is also provided with a signal device which is automatically actuated by the lever 9. This signal device is in the form of a bell and is received between two uprights 31 which are secured to the body 1 and are pivotally mounted thereto as shown at 32. The bell has rigid therewith an upstanding arm 33 to which is pivotally connected a jointed link comprising the two pivotally-connected sections 34, 35. Said jointed link is pivotally connected to the upper end of a rod 36 which extends through an opening 37 formed in the body 1. The lower end of this rod 36 is pivotally connected to a rod 38, the rear end of which is pivotally connected to the lower end of the lever 9 as shown at 39 and the front end of which extends through a guide opening 40 formed in one of the arms of the U-shaped bracket 7. The vibrating movement of the lever 9 as indicated by the full and dotted lines Fig. 1 will operate through the connections above described to ring the bell and thus give a warning signal.

I claim:

1. In a toy vehicle, the combination with a body, rear and front wheels on which the body is mounted, the rear wheels being driving wheels, a rear axle comprising two sections to which the driving wheels are rigidly secured, the inner ends of the sections being bent at right angles, a pin connecting said right angle portions, a lever pivoted to the body, a connecting rod pivotally connected to the lower end of the lever, said connecting rod being provided at its rear end with two plates each having a half round portion which embraces the pin, and a bearing sleeve interposed between the pin and the half round portions.

2. In a toy vehicle, the combination with a body of front and rear wheels on which the body is mounted, the rear wheels being driving wheels, a rear shaft section rigid with each rear wheel, each shaft section having its inner end bent at right angles, a pin connecting the right angle portions and forming a crank, an actuating lever pivoted to the body, and a connecting rod connecting the lever to said crank, said connecting rod comprising two metal side plates which are pivotally connected to the lever, a wooden filling member between the side plates and two metal plates secured to the rear end of the filling member and each having a half round portion that embraces the crank pin.

3. In a toy vehicle, the combination with a body, of a bracket member secured to the under side of the body at the front thereof, steering wheels pivoted to said bracket member, other bracket members secured to the body at the rear thereof, driving wheels journalled in said latter bracket members, an actuating lever for operating the driving wheels, and an audible signal device connected to said lever to be operated by the vibratory movement thereof.

4. In a toy vehicle, the combination with a body, of a bracket member secured to the under side of the body at the front thereof, steering wheels pivoted to said bracket member, other bracket members secured to the body at the rear thereof, driving wheels journalled in said latter bracket members, an actuating lever for operating the driving wheels, two uprights rising from the front of the vehicle body, a bell pivoted between the uprights, and means for ringing the bell by the vibrating movement of the actuating lever.

5. In a toy vehicle, the combination with a body, of a bracket member secured to the under side of the body at the front thereof, steering wheels pivoted to said bracket member, other bracket members secured to the body at the rear thereof, driving wheels journalled in said latter bracket members, an actuating lever for operating the driving wheels, two uprights rising from the front of the vehicle body, a rod pivoted at one end to the actuating lever and guided and supported at the other end by the first-named bracket, a second rod connected to the first-named rod and extending through an aperture in the body, and a connection between said second rod and the bell, whereby the latter will be rung when the operating lever is actuated.

In testimony whereof, I have signed my name to this specification.

JOHN SEPON.